(No Model.) 4 Sheets—Sheet 1.
H. MOESER.
TUNNEL.

No. 447,735. Patented Mar. 3, 1891.

WITNESSES: INVENTOR,
Darwin S. Wolcott Henry Moeser
F. E. Gaither by George H. Christy
  Att'y.

(No Model.) 4 Sheets—Sheet 2.
H. MOESER.
TUNNEL.
No. 447,735. Patented Mar. 3, 1891.
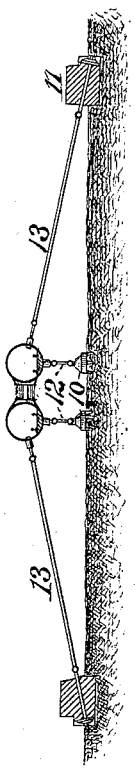
FIG. 3.
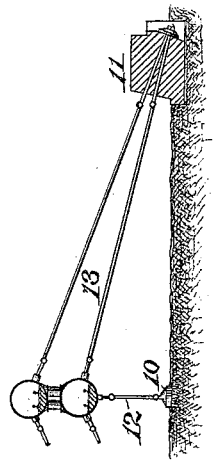
FIG. 5.
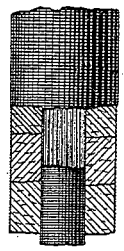
FIG. 11.
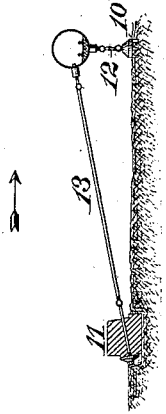
FIG. 2.
FIG. 4.
WITNESSES:
Danwn S. Wolcott
F. E. Gaither
INVENTOR,
Henry Moeser
by George H. Christy
Att'y.

(No Model.) 4 Sheets—Sheet 3.
H. MOESER.
TUNNEL.

No. 447,735. Patented Mar. 3, 1891.

WITNESSES:
Darwin S. Wolcott
F. E. Gaither.

INVENTOR,
Henry Moeser
by George H. Christy Att'y.

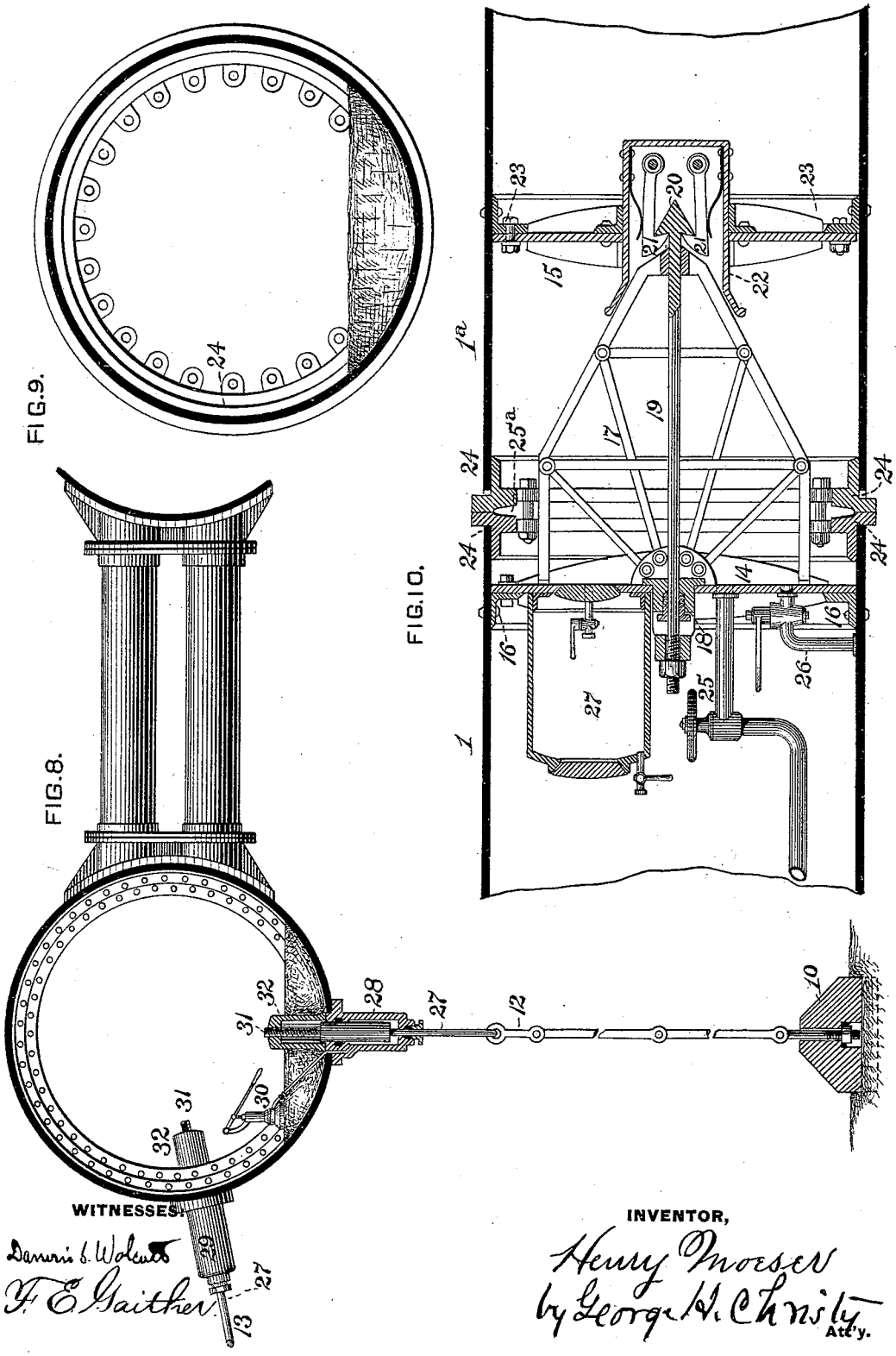

United States Patent Office.

HENRY MOESER, OF ALLEGHENY, PENNSYLVANIA, ASSIGNOR OF ONE-THIRD TO ALBERT H. MOESER, OF SAME PLACE.

TUNNEL.

SPECIFICATION forming part of Letters Patent No. 447,735, dated March 3, 1891.

Application filed April 9, 1890. Serial No. 347,222. (No model.)

*To all whom it may concern:*

Be it known that I, HENRY MOESER, a citizen of the United States, residing at Allegheny, in the county of Allegheny and State of Pennsylvania, have invented or discovered certain new and useful Improvements in Tunnels, of which improvements the following is a specification.

The invention described herein relates to certain improvements in tunnels for traversing navigable rivers, ocean-channels, and other large bodies of water.

Heretofore tunnels for traversing bodies of water have generally either been made by excavating though the earth below such body of water or by a tube or cylinder formed of metal lying upon the bed of rivers, as it is only for traversing such bodies of water—*i. e.,* having comparatively little depth—that the latter kind of tunnel is adapted. It is well known that tunnels excavated through earth are not only very costly and difficult in construction, but the men engaged thereon are constantly exposed to great dangers.

The present invention has for its object a structure in which the cost of building is slight when compared with that of excavated tunnels, and which is adapted for use in crossing large and deep bodies of water and will not in any way interfere with the navigation of such bodies of water.

Figure 1:
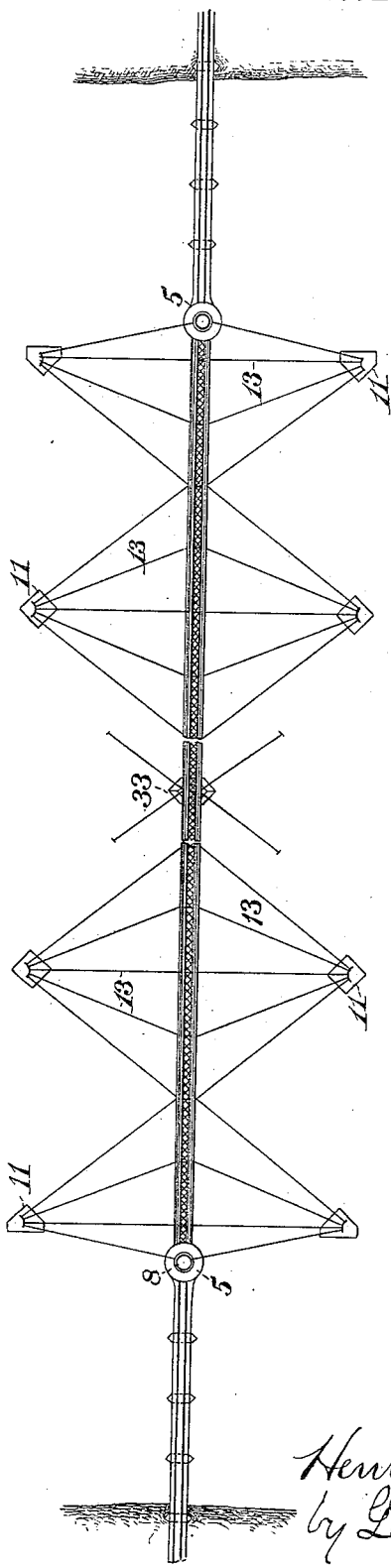
Figure 6:
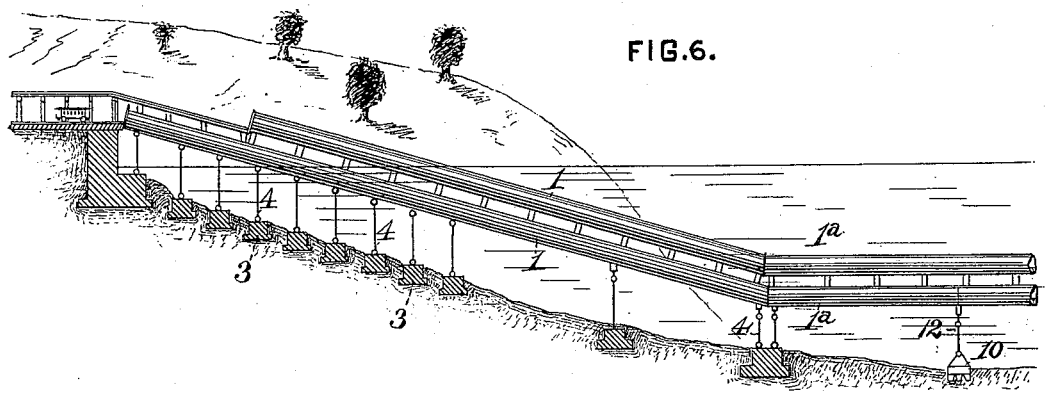
Figure 7:
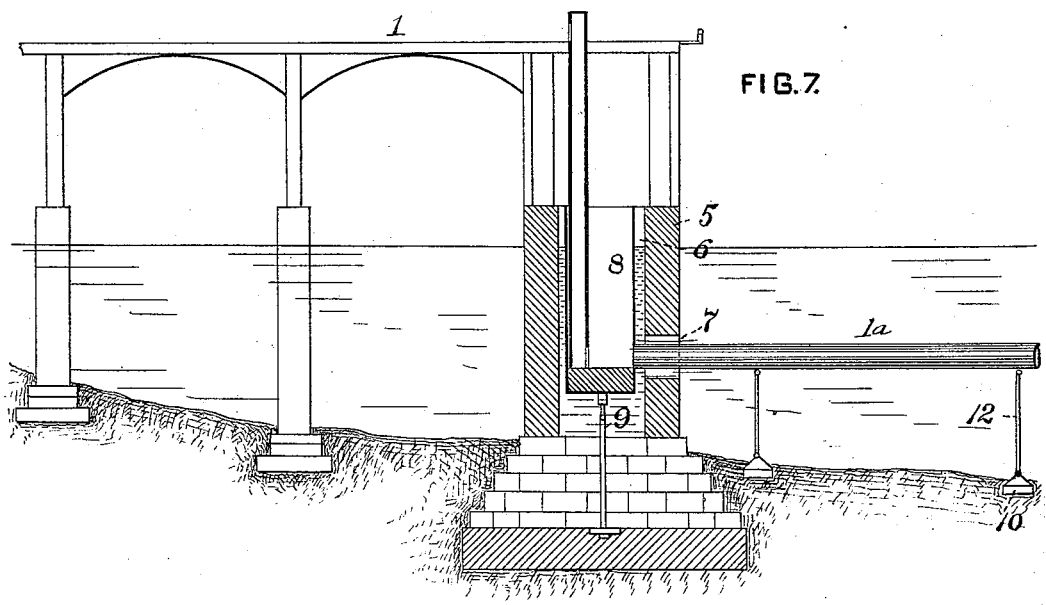

In the accompanying drawings, forming a part of this specification, Figure 1 is a plan view showing the arrangement of my floating tunnel across a body of water. Fig. 2 is a sectional elevation showing the manner of anchoring the tunnel where the current of the stream or body of water is always in one direction. Fig. 3 is a similar view of the anchorage employed where the current flows at different times in opposite directions, twin tunnels arranged side by side being shown. Fig. 4 is a view similar to Fig. 3, showing the arrangement of four tunnels. Fig. 5 shows twin tunnels arranged one above the other. Fig. 6 is a view in elevation of the shore-approaches of the tunnel. Fig. 7 is a sectional elevation of a modification of the shore-approaches; Fig. 8, a sectional elevation showing the manner of securing the anchoring-guys to the tunnel and also the manner of uniting adjacent tunnels. Fig. 9 is a transverse section through the point of junction of two sections of the tunnel. Fig. 10 is a longitudinal vertical section illustrating the manner of connecting adjacent sections of the tunnel when submerged, and Fig. 11 is a detail view, on an enlarged scale, illustrating the buoyant jacket on the guys.

In describing my invention I will suppose for the sake of clearness that a tunnel for traversing a wide deep body of water—as the English Channel—is to be constructed, and it will be understood that many details of construction and manipulation, such as will readily suggest themselves to the skilled engineer but are not necessary for a full understanding of the invention, are omitted. The manner of constructing the shore-approaches, which is the first step in building the tunnel, will depend upon the depth of the water near the shore. When the water is deep near the shore, the construction shown in Fig. 6 may be advantageously employed. The shore-section 1 consists of a cylinder of large diameter formed of steel or wrought-iron plates firmly riveted or bolted together and of sufficient length to extend from the shore-abutment, on which one end of the section rests, to a point where the water is sufficiently deep to permit of the desired submersion of the tunnels. The portion 1 may be formed or built in one piece or in several sections, which can be subsequently united in the manner hereinafter described in connection with the construction of the middle portions of the tunnels. Before the portion 1 is moved into position suitable anchorages 3 are constructed on the bottom of the channel along the proposed line of the tunnel, and on these are pivotally secured suitable struts 4, to whose upper ends the portion 1 of the tunnel is secured. These struts are constructed in a suitable manner and are adapted to support, in part at least, the portion 1 of the tunnel. The upper ends of the struts are also pivotally connected to the under sides of the portion 1, so as to permit of the longitudinal movement of the tunnel under changes of temperature. Two struts are arranged on the outermost of the anchorages 3, one adapted to support the outer end of the portion 1 and the other to support the inner end of the next adjacent portion 1ª of the tunnel, as shown in Fig. 6. Before submerging the outer end of the portion 1 a removable partition 14, to be hereinafter described, is secured in such outer end, so as to prevent the ingress of the water.

Where the water is comparatively shallow for a considerable distance from the shore, I prefer to construct a bridge from the shore out to a point where the water is sufficiently deep for the desired submergence of the tunnel. The bridge 1, for the purposes of this invention, being the equivalent of the inclined tunnels, hereinbefore described, may be constructed in any suitable manner. At its outer end a hollow pier 5 is constructed, the opening or shaft 6 of the pier extending below the level at which the tunnels are to be arranged, as shown in Fig. 7. The end of the tunnel-section 1ª is passed through a horizontal opening 7 in the outer wall of the pier and is inserted through the wall of metal cylinder 8, having its lower end closed and arranged to float within the shaft in the pier. The cylinder is held from vertical movement by a suitable guy or guys 9, having their lower ends secured in the masonry of the pier, while the opposite end is attached to the cylinder 8 in any suitable manner, but preferably in the same manner as the guys are attached to the tunnels, to be hereinafter described. The shaft 6 and cylinder 8 are made of such relative diameters or transverse dimensions as will permit of perfect freedom of lateral movement of the cylinder when acted on by the tunnel as it expands and contracts under changes of temperature. It will be understood that a tight joint is formed between the tunnel and cylinder, which is made of such height that its upper end will be at least above the highest water-mark, and it may be extended so as to bring its upper end on a level with the surface of the bridge. Suitable elevators are to be provided within the cylinder for raising or lowering passengers and freight. Where two or more tunnels are employed, as hereinafter described, the vertical cylinder is divided by vertical partitions into as many compartments as there are tunnels, each tunnel entering a separate compartment, or, if desired, two or more cylinders—one for each tunnel—can be arranged within the pier. This pier, in addition to serving as a terminus for the bridge, will protect the vertical cylinders from the action of the waves.

The shore-approaches having been formed as described, the next step in constructing the tunnel is to provide suitable anchorages 10 and 11 for the vertical and lateral guys 12 and 13, respectively. These anchorages consist of any suitable masonry in which the outer ends of the guys 12 and 13 are firmly secured in any suitable manner. After the guys, which may be of any suitable construction—i. e., wire rope, or chains, protected against corrosion—are firmly secured in their anchorages at one end, their free ends are attached to buoys temporarily, so that they may be recovered when it is desired to attach them to the tunnel, as hereinafter described.

The middle portion of the tunnel is made in sections of any suitable length—say of five hundred or a thousand feet, more or less—at any convenient point on the shore. The ends of the section 1ª are then closed by any suitable removable partitions 14 and 15, capable of being removed when desired, and the section is then floated or carried on lighters out to the position it is intended to occupy. Prior to closing the ends of the section 1ª the requisite amount of ballast, formed of broken stone or other suitable material, is distributed therein. Water is then admitted into the tunnel-section 1ª in sufficient quantity to cause it to sink to the desired level. During its descent it is guided by suitable guys leading from suitable apparatus on lighters, which are properly anchored, so as to hold and shift the tunnel-section, as required. As soon as the section 1ª is in line both vertically and horizontally with the outer end of the shore-section 1 or of a previously-arranged floating section, it is caused to move up against the end of such previously-laid section 1 and secured thereto.

One form of construction of apparatus adapted to guide and hold the section 1ª against the end of the portion or section 1 is illustrated in Fig. 10. The removable partition 14 in the outer end of the previously-laid section 1 consists of a properly-braced plate secured at its edges by removable bolts to an angle-piece 16, which is riveted or bolted inside of the section 1 at or near its outer end prior to its being sunk into position. To the outer face of this plate 14 is firmly secured a frame-work 17, whose outer portion projecting beyond the section 1 is shaped like a cone, and through a stuffing-box 18 in the center of the plate 14 is passed a shaft 19. This shaft extends through the frame-work 17, and is provided at its outer end with a conical head 20, whose sides are practically prolongations of the conical portion of the frame-work, and whose base forms a shoulder for engagement with the spring-actuated hooks 21. These hooks, three or more in number, are arranged in a shell or case 22, secured in the center of the plate forming the removable partition 15 in the end of the tunnel-section 1ª. This plate is removably bolted to an angle-piece 23, riveted in the section 1ª near its end. The outer end of the shell or case is preferably made flaring, so as to guide the section 1ª by contact with the conical frame-work into nearly exact alignment with the section 1. As the conical head 20 enters the case or shell the spring-hooks are forced apart thereby, and as the head continues its inward movement the hooks slide along its side and catch over the shoulder formed by its base. The inner end of the shaft 19 is threaded, so that as soon as the hooks engage the head 20 the nut on the threaded end of the shaft is screwed up, thereby drawing the section 1ª tightly against the section 1. As the faces of the flange-rings 24, riveted on the ends of the sections 1 1ª, have been trued up they will form a comparatively tight joint when drawn together, as described.

In order to remove the water inclosed between the partitions of the two sections, air is forced through the pipe 25 into the space between the partitions, thereby forcing the water therein out through the pipe 26, which has one end inserted through the plate 14 and the other end projecting out through the wall of the section 1. The air-pressure thus generated between the partitions 14 and 15 not only serves to drive out the inclosed water, but also to prevent to a considerable extent any leakage between the flange-rings 25. The removable partition 14 is provided with an air-lock 27, so as to permit of the entrance of workmen between the partitions for the purpose of bolting the flange-rings 24 together. After the flange-rings have been bolted together packing formed of lead or any other suitable material is forced into the V-shaped slot or groove 25ª, formed by properly beveling the adjacent faces of the flange-rings 24, as shown in Fig. 10. As soon as the section 1ª has been sunk to position, as described, the vertical and lateral guys 12 and 13 are connected to the rods 27 of the pistons of the fluid-pressure cylinders 28 and 29, which are secured to the bottom and sides of the tunnel, as shown in Fig. 8. The guys thus attached serve to hold the section 1ª in an approximately correct position during the bolting together of the two sections. After the joint between the sections has been packed, as described, the plate 15 is removed and the guys 12 and 13 are tightened up, thereby drawing the section 1ª into proper alignment, both vertically and horizontally, by forcing water or other fluid by means of a pump 30, as shown in Fig. 8, into the cylinders 28 and 29.

In order to hold the guys under proper tension, the pistons of the cylinders 28 and 29 are provided with threaded stems 31 projecting upwardly into the tunnel, and on these stems are placed the nuts 32, constructed to have a bearing upon the cylinder-heads or portions of the tunnels adjacent thereto. After the guys have been properly tightened and the tunnel-section drawn into proper alignment the nuts 32 are screwed down, thereby preventing slackening of the guys in case of leakage of fluid-pressure from the adjusting-cylinders.

It being practically impossible on account of the length and weight of the lateral guys to draw them sufficiently tight to remove all sagging, which under the action of the current, &c., might allow some lateral movement of the tunnel, it is preferred to surround said guys with a jacket of cork or other buoyant material, as shown in Fig. 11, so as to overcome their great specific gravity and permit of their being drawn taut into a practically straight line from their anchorages to the tunnel.

It is preferred to secure the tunnel at or about its middle to a pier 33, which will serve not only as a support for the tunnel but will insure a proper distribution of the longitudinal movements of the tunnel under changes of temperature—i. e., from the center toward the ends, and vice versa.

As shown in Figs. 3 to 5, two or more tunnels may be united in an integral structure, the several tunnels being securely connected by any suitable system of tie-rods and braces.

As shown in Fig. 2, lateral guys are required on one side only of the tunnel when located across bodies of water where there is a constant current in one direction.

As shown in Fig. 1, a number of the lateral guys may be connected to the same anchorage, and such an arrangement is preferred as preventing any longitudinal movement or end-thrust of the tunnel by reason of cross-currents or the passage of trains through the tunnels. Where two or more tunnels are arranged together, as hereinbefore stated, the ballast in each tunnel should be so proportioned relative to the buoyancy thereof that in case of the filling of one of the tunnels with water the other tunnel will have such a surplus of buoyancy as to prevent their sinking to the bottom, thereby destroying both tunnels.

I claim herein as my invention—

1. The combination of two or more floating tunnels secured together in approximate parallelism with each other, and guys for holding such tunnels in suitable position below the surface of the water, substantially as set forth.

2. A floating tunnel, in combination with guys for holding the tunnel in suitable position below the surface of the water, and a pier or anchorage for securing the middle portion of the tunnel as against longitudinal movement, substantially as set forth.

3. The combination of a floating tunnel, guys having their outer ends attached to suitable anchorages, and adjustable connections uniting the opposite ends of the guys to the tunnel, substantially as set forth.

4. The combination of a floating tunnel, guys having their outer ends attached to suitable anchorage, and fluid-pressure cylinders secured to the tunnels and having their pistons attached to the inner ends of the guys, substantially as set forth.

5. The combination of a floating tunnel, guys for holding the tunnel in suitable position below the surface of the water, and cylindrical shore-sections arranged with their axes at an angle of the floating tunnel, the shore-sections being movable with the floating sections during the expansion and contraction thereof, substantially as set forth.

6. The combination of a floating tunnel, guys for holding the tunnel in suitable position below the surface of the water, hollow piers at the ends of said tunnel, and vertical cylinders floating within said piers, the tunnels passing through the walls of the piers and connecting with the cylinders, substantially as set forth.

7. The combination of a floating tunnel and guys for holding the tunnel in suitable position below the surface of the water, said guys being provided with jackets formed of a material of less specific gravity than the water, substantially as set forth.

In testimony whereof I have hereunto set my hand.

HENRY MOESER.

Witnesses:
R. H. WHITTLESEY,
DARWIN S. WOLCOTT.